United States Patent
Guo et al.

(10) Patent No.: US 12,445,033 B2
(45) Date of Patent: Oct. 14, 2025

(54) DRIVER FOR DELIVERING CURRENT TO A LED LOAD

(71) Applicant: SIGNIFY HOLDING B.V., Eindhoven (NL)

(72) Inventors: Bing Guo, Shanghai (CN); Honghao Zhong, Shanghai (CN); Muhui Huang, Shanwei (CN); Yefen Yu, Shanghai (CN)

(73) Assignee: SIGNIFY HOLDING B.V., Eindhoven (NL)

( * ) Notice: Subject to any disclaimer, the term of this patent is extended or adjusted under 35 U.S.C. 154(b) by 93 days.

(21) Appl. No.: 18/580,680

(22) PCT Filed: Jul. 15, 2022

(86) PCT No.: PCT/EP2022/069921
§ 371 (c)(1),
(2) Date: Jan. 19, 2024

(87) PCT Pub. No.: WO2023/001714
PCT Pub. Date: Jan. 26, 2023

(65) Prior Publication Data
US 2024/0372456 A1 Nov. 7, 2024

(30) Foreign Application Priority Data

Jul. 23, 2021 (WO) .................. PCT/CN2021/108263
Sep. 10, 2021 (EP) ...................................... 21195877

(51) Int. Cl.
*H02M 1/00* (2007.01)
*H04N 9/31* (2006.01)
(Continued)

(52) U.S. Cl.
CPC ........ *H02M 1/0025* (2021.05); *H04N 9/3155* (2013.01); *H05B 45/10* (2020.01); *H05B 45/325* (2020.01); *H05B 45/3725* (2020.01)

(58) Field of Classification Search
CPC ... H02M 1/0025; H05B 45/325; H05B 45/10; H05B 45/3725; H04N 9/3155
See application file for complete search history.

(56) References Cited

U.S. PATENT DOCUMENTS

| 8,358,118 B2 * | 1/2013 | Chen ..................... H02M 3/156 323/222 |
| 8,829,868 B2 * | 9/2014 | Waltman ............. H02M 3/1584 323/272 |

(Continued)

FOREIGN PATENT DOCUMENTS

| WO | 2020260147 A1 | 12/2020 | |
| WO | WO-2022225546 A1 * | 10/2022 | .......... H02M 1/0012 |

(Continued)

*Primary Examiner* — Adam D Houston

(57) ABSTRACT

A driver has a current control loop for regulating an output current, the current control loop having a controllable configuration including an electrical value with influences the conversion function of the converter. An adjusting circuit is provided to selectively deliver or not deliver output current of the converter to the load and effectively adjust a load as seen by the driver between a first level and a second level. This adjustment for example enables PWM control of the output current, in addition to the output current regulation implemented by the current control loop. The electrical value of the current control loop is saved before the adjusting circuit changes the load as seen by the driver from the first level to the second level and the saved electrical value is reapplied to the current control loop, when the adjusting circuit changes the load as seen by the driver back from the second level to the first level. A response time of the current control loop when controlling the converter to output the (Continued)

desired output current is reduced. The electrical value is a voltage of a capacitor in a compensation circuit of an error amplifier of the current control loop.

15 Claims, 4 Drawing Sheets

(51) Int. Cl.
  *H05B 45/10* (2020.01)
  *H05B 45/325* (2020.01)
  *H05B 45/3725* (2020.01)

(56) References Cited

U.S. PATENT DOCUMENTS

| | | | | |
|---|---|---|---|---|
| 8,913,404 B2* | 12/2014 | Xu | | H02M 3/33523 |
| | | | | 363/21.13 |
| 9,596,724 B2* | 3/2017 | Cohen | | H05B 45/385 |
| 9,831,768 B2* | 11/2017 | Lam | | H02M 3/158 |
| 10,136,488 B1 | 11/2018 | Kwon et al. | | |
| 12,184,165 B2* | 12/2024 | Cui | | H02M 1/0025 |
| 2009/0322234 A1 | 12/2009 | Chen et al. | | |
| 2010/0019697 A1* | 1/2010 | Korsunsky | | H05B 45/3725 |
| | | | | 315/307 |
| 2010/0164446 A1* | 7/2010 | Matsuo | | H02M 3/158 |
| | | | | 323/282 |
| 2011/0261596 A1* | 10/2011 | Zong | | H02M 3/33507 |
| | | | | 363/21.13 |
| 2013/0223108 A1* | 8/2013 | Xu | | H02M 3/335 |
| | | | | 363/21.17 |
| 2013/0320850 A1 | 12/2013 | Nakamura | | |
| 2015/0061614 A1* | 3/2015 | Cohen | | G01R 19/0038 |
| | | | | 323/271 |
| 2016/0183337 A1 | 6/2016 | Galvano et al. | | |
| 2016/0323947 A1* | 11/2016 | Seki | | H05B 45/10 |
| 2018/0049283 A1* | 2/2018 | Lee | | H05B 45/38 |
| 2018/0288839 A1 | 10/2018 | Safaee | | |
| 2019/0132921 A1* | 5/2019 | Rumer | | H05B 45/375 |
| 2020/0314975 A1 | 10/2020 | Pruett | | |
| 2021/0045212 A1* | 2/2021 | Lai | | H05B 45/14 |
| 2024/0022170 A1* | 1/2024 | Black | | H02M 1/0003 |
| 2024/0372456 A1* | 11/2024 | Guo | | H02M 1/0025 |

FOREIGN PATENT DOCUMENTS

| | | | | |
|---|---|---|---|---|
| WO | WO-2023001714 A1 * | 1/2023 | | H04N 9/3155 |
| WO | WO-2023175086 A1 * | 9/2023 | | H02M 1/088 |

* cited by examiner

DRIVER FOR DELIVERING CURRENT TO A LED LOAD

CROSS-REFERENCE TO PRIOR APPLICATIONS

This application is the U.S. National Phase application under 35 U.S.C. § 371 of International Application No. PCT/EP2022/069921, filed on Jul. 15, 2022, which claims the benefit of International Application No. PCT/CN2021/108263, filed on Jul. 23, 2021 and European Patent Application Ser. No. 21/195,877.2, filed on Sep. 10, 2021. These applications are hereby incorporated by reference herein.

FIELD OF THE INVENTION

The invention relates to a driver for delivering current to a LED load.

BACKGROUND OF THE INVENTION

Lighting drivers commonly use switch mode power converters for delivering current to a lighting load. It is desirable to be able to control the effective current level, for example in order to implement dimming control.

For some applications, it is desirable to have a large possible dimming range. For example, for light projector display applications, a wide dimming range enables a display contrast ratio to be enhanced and enables improved color fidelity.

Dimming can be achieved by adjusting an analog output current, in other words, adjusting a stable amplitude of a stable output current, delivered to a LED load (analog dimming) or by delivering a constant peak amplitude current but with a duty cycle based on pulse width modulation (PWM). This provides digital dimming. One implementation of PWM control involves short circuiting the load when it is to be turned off, but continuing to output of current by the driver for a fast future turn on of the load when the load is not short circuited any more.

It is also known to combine these two approaches in order to extend the dimming range. Thus, analog dimming may be used for a first range of dimming levels, and this range can be extended using PWM control, without increasing the range of adjustment which needs to be enabled by the analog dimming.

The present application mainly relates to the PWM control of dimming. When the load is not short circuited, the load as seen by the driver has a substantial value, but when the load is short circuited, the load as seen by the driver is no longer at a substantial level and is instead almost zero. The use of PWM control is that the load seen by the power converter is different in the different PWM states. As a result, the control loop which regulates the output current (for the analog dimming control) will adjust the converter operating point when switching between the different PWM states. This results in delays for the control loop to settle at each change in PWM state, and this can cause inaccuracies in the brightness level. This problem will be described in more detail below.

There is a need for an improved driver which can provide fast current regulation when coping with load changes (e.g. caused by PWM control).

US20090322234A1 discloses a LED driver with multiple feedback loops, wherein the feedback control loop comprises an amplifier with a frequency compensation network formed by capacitors and a resistor.

SUMMARY OF THE INVENTION

The invention is defined by the claims.

The inventors find that the control loop has at least one electrical value that is formed by the control loop when the converter provides a desired output at a certain loading state, and this electrical value can be retrieved by the control loop to control the converter to maintain the output at the certain loading state. The control loop needs to change the electrical value when the loading state varies and this changing results in the above mentioned delay. Thus, the basic idea of the invention is saving the electrical value when the driver is loaded/the load is not short circuited; changing the load for PWM control purposes; and re-applying the saved electrical value to the control loop directly when the load is changed back. Thus, the control loop retrieves the previously saved electrical value, which was just suitable in the loaded state in order to provide the desired output. The electrical value is thereby retrieved at a much faster speed (than the normal control loop regulation speed), thus the control loop can control the driver to output the desired output more quickly. More specifically, it is a concept of the invention to provide a driver with a current regulating converter. A current control loop has a controllable configuration thereby providing different current control options. An adjusting circuit adjusts a total load as seen by the driver between a first level and a second level, and this is used to implement current regulation in addition to the current control loop. The configuration of the current control loop is saved before the adjusting circuit changes the load as seen by the driver from the first level to the second level. The saved configuration of the current control loop is re-applied when the adjusting circuit changes the load as seen by the driver back from the second level to the first level. In this way, the speed of response of the current control loop is increased when switching between the different load levels, for example resulting from PWM dimming control. More specifically the electrical value is a voltage of a capacitor in a compensation circuit coupled to an output of an error amplifier in the control loop.

According to examples in accordance with an aspect of the invention, there is provided a driver, comprising:
  an input to receive input power,
  a converter to convert the input power to an output current;
  a current control loop for controlling the converter and regulating the output current, the current control loop having an error amplifier and a first compensation circuit provided to an output of the error amplifier, said first compensation circuit comprises a first capacitor;
  an output to output said output current to a load;
  an adjusting circuit to selectively deliver, or not deliver, the output current to the load and effectively adjust the load as seen by the driver between a first level and a second level, and
  a controller for controlling the adjusting circuit and the current control loop, wherein the controller is adapted to:
    save the voltage of the first capacitor by disconnecting the first capacitor from the output of the error amplifier, before the adjusting circuit changes the load as seen by the driver from the first level to the second level; and
    re-connect the first capacitor with the saved voltage to the output of the error amplifier of the current control loop, when the adjusting circuit changes the load as seen by the driver back from the second level to the first level.

This driver has a current control loop for maintain a stable amplitude of the output current, given the variable loading state. In addition, the load seen by the driver is adjusted, for example it may be switched to a short circuit to prevent current reaching the load. This enables PWM output current control in that the current to the load can be reduced to zero. The first level of the load for example corresponds to a load-in mode in the PWM control and the output current being delivered to the load and the second level corresponds to a load-out mode in the PWM control and the output current, though being generated by the driver, is not being delivered to the load. The control loop output is different for different loads: if the LED is present, the control loop output needs to output a relatively high control signal to control the driver to work at e.g. a 75% duty cycle of the switch mode power converter to provide a certain (desired) current; whereas if the LED is short circuited, the control loop output needs to output a relatively low control signal to control the driver to work at only e.g. a 10% duty cycle to provide the same current.

The internal state of the current control loop, for example a voltage across an operational amplifier (opamp)/error amplifier, is dependent on the load and influences the control loop output. If the load changes, traditionally the control loop would slowly change, for example by changing the internal state to reach the same output of the opamp again, thus the response speed is slow. The invention proposes that the state (in the form of an electrical value) is saved and re-applied directly when the load is back, avoiding that the control loop tunes its internal state by itself. Thus, the response time is quicker to return to the normal state.

The current control loop is for example for regulating a stable peak amplitude of the output current at a desired value, the error amplifier is adapted to compare the output current with a reference current, and the adjusting circuit is for adjusting an effective current amplitude to the load by applying a duty cycle in which the output current with a stable peak amplitude is delivered to the load.

Thus, the driver has a stable peak amplitude regulation (e.g. analog current level) and additionally an effective amplitude regulation by PWM duty cycle control. This can be used to extend the range of current adjustment, for example the dimming range in the case of a LED driver. During the PWM duty cycle control, when the output of the driver is short circuited, different current control loop characteristics are needed compared to when the output of the driver is connected to the load.

The controller is for example adapted to apply a PWM control signal to the adjusting circuit. This provides digital PWM current control, such as PWM digital dimming of a LED load.

The adjusting circuit may comprise a circuit to selectively:
 open to allow the output current to go through the load, so as to set a load as seen by the driver at the first level; and
 short circuit to conduct the output current and bypass the load, so as to set the load as seen by the driver at the second level, for example a zero load level.

By bypassing the load, the load is turned off, and this provides a PWM duty cycle control of current control.

The adjusting circuit for example comprises a FET for connection in parallel with the load.

The control loop may be adapted to retrieve a voltage level or charge level as the electrical value to control the converter to regulate the output current, the controller is adapted to:
 configure the current control loop to include a first capacitor when the LED load is not short circuited and the charge or voltage level of the first capacitor is retrieved by the control loop to control the converter;
 to decouple the first capacitor from the current control loop before the load is short circuited thereby saving the value of the charge level or voltage level of the first capacitor;
 short circuit the load; and
 re-configure the current control loop to couple the first capacitor to the current control loop and substantially simultaneously re-connect the load again such that the current control loop is able to retrieve the saved charge or voltage level of the first capacitor instantly.

The first capacitor determines the characteristics of the current control loop when in the load-in (not bypassed) mode. By disconnecting the first capacitor from the circuit, there is no path for the component to change its charge/voltage thus it inherently retains its charge or voltage during the time that the current control loop is configured to the load-out bypass mode. And by re-connecting it back to the control loop, the control loop can retrieve the same previous value of the charge/voltage and can quickly control the driver to output a current as the same as previously outputted in the last loaded period.

The control loop is for example adapted to output a control output depending on the voltage of the first compensation circuit to adjust the converted power of the converter, wherein the control loop is adapted to:
 form and retrieve a voltage of the first capacitor as the electrical value so as to output a high output to control the converter to output high power when the load is the first level, and
 form and retrieve a changed electrical value so as to output a low output lower than the high output to control the converter to output low power when the load is the second level.

The controller may configure the current control loop to replace the first capacitor with a second capacitor when the load is short circuited, and to decouple the second capacitor from the current control loop and replace with the first capacitor when the load is re-connected again.

The second capacitor determines the characteristics of the current control loop when in the bypassed mode.

The current control loop may comprise a current sensing component adapted to sense the output current of the driver, the first compensation circuit is between the output and an inverting input of the error amplifier,
 wherein the second capacitor in a second compensation circuit of the error amplifier, and wherein the controller is adapted to control a switch which selects one of the first and second compensation circuits.

The current control loop thus sets the integration time and gain of an integrating amplifier in a current sensing circuit. In such a topology, the output of the opamp is dependent on the voltage on the first or second capacitor of the feedback circuit. Thus by saving and re-applying a voltage of the first capacitor, the control loop can quickly recover to its previous state which was for the previous loaded state, thus the control loop can quickly control the driver to output the same output current in the same loaded state.

The first and second compensation circuits for example each further comprise a resistor for forming a series resistor-capacitor circuit, wherein the first and second feedback circuits are connected alternately. This implements a PWM digital control of the output current.

The error amplifier may be adapted to receive the sensed output current at the inverting input of the error amplifier, and to receive a reference current at a non-inverting input of the error amplifier, and is adapted to output a voltage substantially equal to the sum of the voltage the inverting input and the voltage on the capacitor in either the first or the second compensation circuit.

Thus by saving and re-applying the voltage of the first capacitor to the control loop, the output of the error amplifier can quickly recover to its previous value for the previous loaded state, thus the control loop can quickly control the driver to output the same output current in the same loaded state.

The driver may comprise a lighting driver, wherein the controller has a dimming signal input for setting a dimming output current of the driver, wherein the adjusting circuit and a the configuration of the current control loop are selected in dependence on the dimming signal input.

The invention also provides a lighting system comprising:
the driver as define above; and
a lighting load driven by the driver.

The lighting load for example comprises a LED arrangement. The invention also provides a LED projector comprising the lighting system defined above.

These and other aspects of the invention will be apparent from and elucidated with reference to the embodiment(s) described hereinafter.

BRIEF DESCRIPTION OF THE DRAWINGS

For a better understanding of the invention, and to show more clearly how it may be carried into effect, reference will now be made, by way of example only, to the accompanying drawings, in which.

DETAILED DESCRIPTION OF THE EMBODIMENTS

Figure 1:
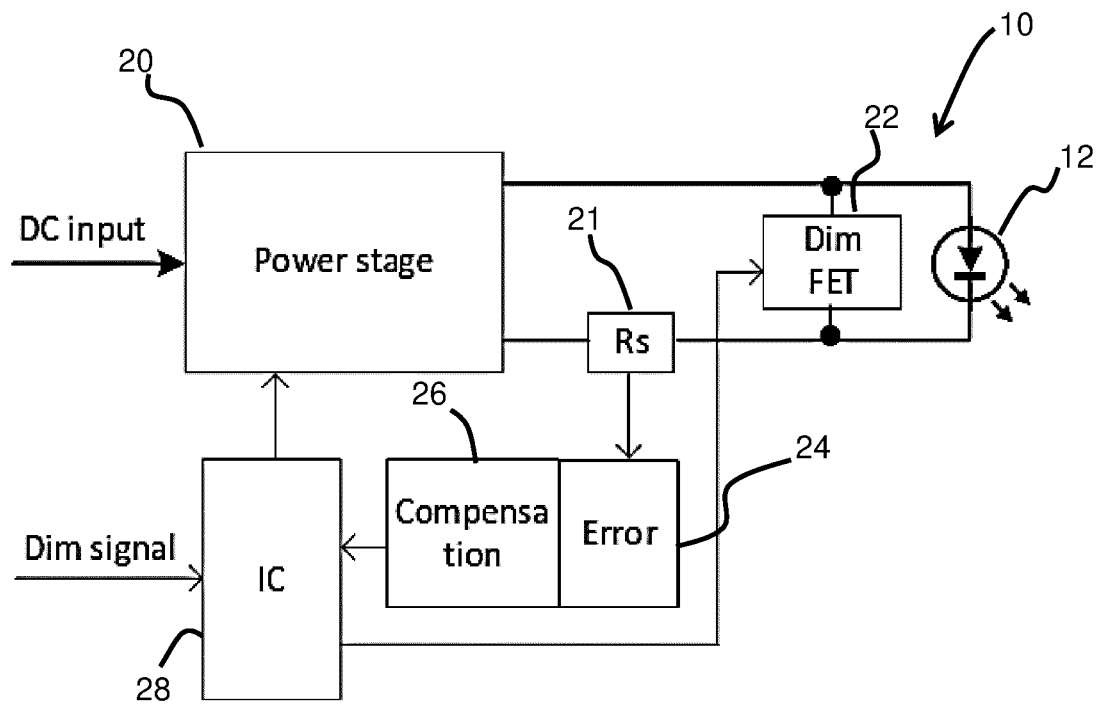
FIG. 1 shows a known driver which implements analog current regulation as well as PWM dimming control.

The invention will be described with reference to the Figures.

It should be understood that the detailed description and specific examples, while indicating exemplary embodiments of the apparatus, systems and methods, are intended for purposes of illustration only and are not intended to limit the scope of the invention. These and other features, aspects, and advantages of the apparatus, systems and methods of the present invention will become better understood from the following description, appended claims, and accompanying drawings. It should be understood that the Figures are merely schematic and are not drawn to scale. It should also be understood that the same reference numerals are used throughout the Figures to indicate the same or similar parts.

The invention provides a driver which has a current control loop for regulating an output current, the current control loop having a controllable configuration including an electrical value with influences the conversion function of the converter. An adjusting circuit is provided in order to selectively deliver or not deliver the output current to the load, and effectively to adjust a load as seen by the driver between a first level and a second level. This adjustment for example enables PWM control of the output current, in addition to the output current regulation implemented by the current control loop. The electrical value of the current control loop is saved before the adjusting circuit changes the load as seen by the driver from the first level to the second level and the saved electrical value is reapplied to the current control loop, when the adjusting circuit changes the load as seen by the driver back from the second level to the first level.

FIG. 1 shows a known driver 10 which implements analog current regulation as well as PWM dimming control.

The driver 10 comprises an input "DC input" to receive input power. A converter 20 converts the input power to an output current. The converter is for example a switch mode power converter such as a buck converter or a buck boost converter. Any suitable converter topology may be used. The switch mode converter has a main power switch which controls whether input power is delivered to the load or if recycled energy is delivered to the load (typically from an inductor). Thus, the main switch of the power converter is controlled using a high frequency switching signal and the duty cycle of switching determines the operating point, namely the output current, of the converter 20.

The output current is delivered to a load 12 in the form of a LED arrangement. The output current is sensed by a current sensor, in particular a current sense resistor 21.

The sensed current is provided to an error amplifier 24 where the sensed current is compared with a reference current. Within the control loop, the output of the error amplifier 24 is provided to a compensation circuit 26. In combination, the error amplifier and compensation circuit 26 implement a current control loop for controlling the converter 20 and regulating the output current.

More specifically, the output of the current control loop is provided to a main control circuit 28 of the power converter 20. The converter 20 is for example controlled by the main control circuit 28 by controlling the timing of switching of the main power switch of the switch mode power converter as mentioned above, in known manner. More specifically, there is feedback control to regulate a duty cycle of the high frequency switching and thereby regulate the output current, in particular for regulating a stable peak amplitude of the output current at the desired reference value.

The feedback system described above provides regulation of the peak current, i.e. analog current control. In addition, an adjusting circuit 22 is provided to for a PWM control of the load, in other words, load-in and load out control to regulate an effective current to the load. By adjusting the load-in and load-out configurations, the adjusting circuit 22 effectively adjusts a load as seen by the driver between a first level and a second level. In the example shown, the adjusting circuit 22 is a shorting transistor (a FET). When turned on, the output current to the load is bypassed and the load seen by the drive is near to zero, whereas when turned off, the output current flows through the load, and the load seen by the driver is the load of the LED arrangement 12. When turned on, the current to LED load drops to zero, so that PWM duty cycle based dimming of the LED load is implemented.

The control circuit receives a dimming signal ("Dim signal") as input and it implements control of the adjusting circuit 22. The dimming signal for example determines the dimming achieved by PWM control.

The control of the adjusting circuit 22 is for example implemented using a PWM dimming signal. When the PWM dimming signal controls the adjusting circuit to create a short circuit, this may be considered to be a load-out mode. When the PWM dimming signal controls the adjusting circuit to create an open circuit, this may be considered to be a load-in mode. The alternation of the load-out and load-in modes determines an effective current to the load over time, thus a desired dimming level is achieved.

When the load changes due to PWM dimming, the current control loop slowly changes its internal state to reach the desired output of the error amplifier again, and the response speed is slow.

A problem with this circuit thus arises because the same current control loop is used for the load-in mode and the load-out mode. When the circuit switches between these modes, especially when the circuit switches from the load-out mode to the load-in mode, the current regulation will adapt the setting of the converter 20 since different converter settings will be needed to maintain the same analog current due to the different loads applied. This means that, when the load-in mode starts, the converter 20 cannot output the same/desired output current instantly but it needs a period of time to output this current, this delay influences the response of the LED load and it may be problematic in high frequency applications like projectors.

To describe this problem in more detail, from a voltage perspective, in lossless conditions, the duty cycle for the control of the main switch of a switch mode power converter is proportional to the output voltage and input voltage (e.g., for a buck converter, the duty cycle D=Vo/Vin, for a boost converter D=(Vo−Vin)/Vo), Thus, when the output voltage changes, the duty cycle will change accordingly. As the load is short circuited, the output voltage becomes very small and the needed duty cycle becomes very low.

A typical PWM generator is a comparator to compare the output signal of the error amplifier with sawtooth signal. A low feedback voltage will generate a low duty cycle PWM signal and vice versa. This technology of PWM generator is well known in the art thus the description will not give further details.

When in the load-out mode, when the dimming FET 22 conducts, the output acts as a short circuit. The voltage gain drops to very low level and the main switch of the converter 20 needs a low duty cycle signal to maintain the output current at the same level. This requires the error amplifier 24 to step its output to a low value. A RC time delay arises in the compensation circuit 26 so the error amplifier 24 takes time to charge the capacitance of the compensation circuit before its output voltage falls accordingly.

When the dimming FET 22 is switched off, the converter operates at the load-in output voltage, so the voltage gain recovers from a very low level. Therefore, the main switch of the switch mode power converter 20 needs a high duty cycle signal to match its operation, and the error amplifier 24 output gradually ramps to a high value. Similarly, the capacitance of the compensation circuit 26 needs to be discharged to cause the error amplifier output voltage rise to a high value.

The time to charge and discharge the compensation circuit capacitance during the PWM dimming will result in unwanted settling/delay times.

The invention provides an adaptive compensation circuit for this type of PWM dimming application. The circuit of the invention provides appropriate compensation parameters for the load-in and load-out modes as explained above, to provide improved independent loop response.

Figure 2:
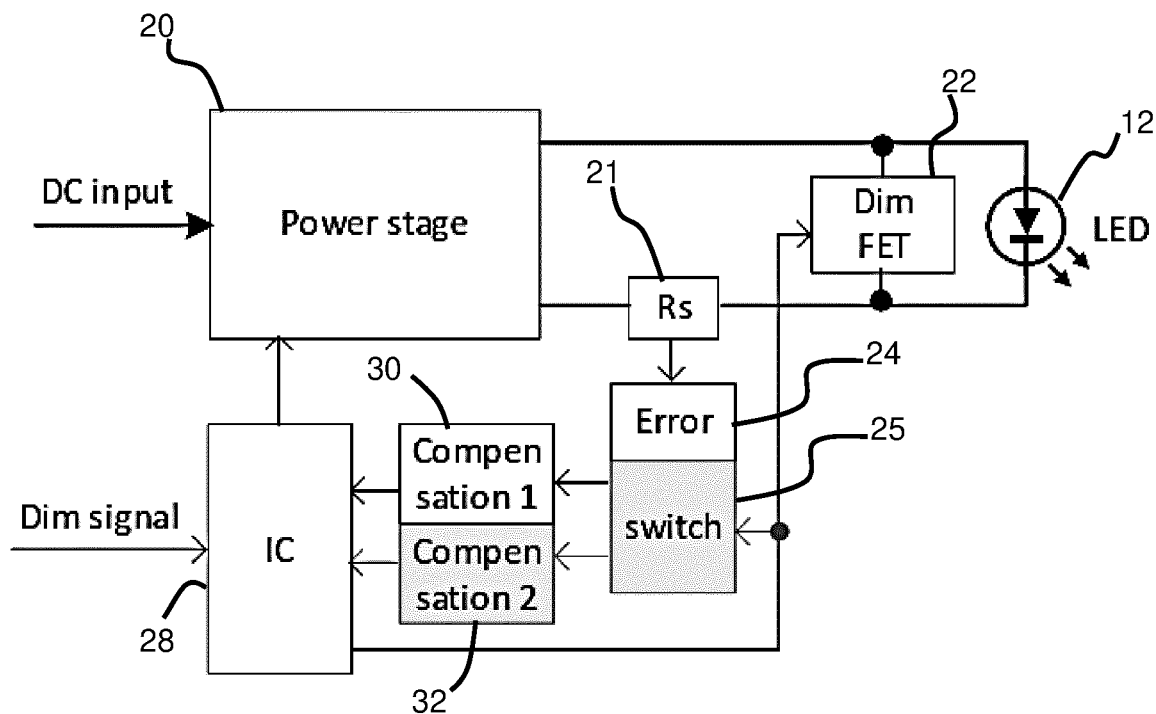
FIG. 2 shows an example of circuit configuration in accordance with the invention.

FIG. 2 shows an example of circuit configuration in accordance with the invention.

The same components are given the same reference numbers as in FIG. 1.

The compensation circuit 26 is replaced with a first compensation circuit 30 and a second compensation circuit 32, and a switch 25 to select one or other of the compensation circuits.

The current control loop may then include one or other of the compensation circuits 30, 32. In this way, the current control loop has a controllable configuration including an electrical value (e.g. a voltage, charge or current associated with components of the compensation circuits) which influences the conversion function of the converter 20.

The electrical value of the current control loop is saved, before the adjusting circuit 22 changes the load as seen by the driver from the first level to the second level (i.e. when switching from the open circuit load-in mode to the short circuit load-out mode). Thus, the electrical set point (voltages or currents or charges) of the first compensation circuit is saved. The saved electrical value is returned to the current control loop when the adjusting circuit changes the load as seen by the driver back from the second level to the first level. Most importantly, the operation of saving and returning the electrical value means the electrical value is kept and directly re-applied to the current control loop, unlike the gradual variation of the charge stored on the control loop capacitance of the compensation circuit when switching between load-in and load-out modes as in the prior art as described above.

Figure 3:
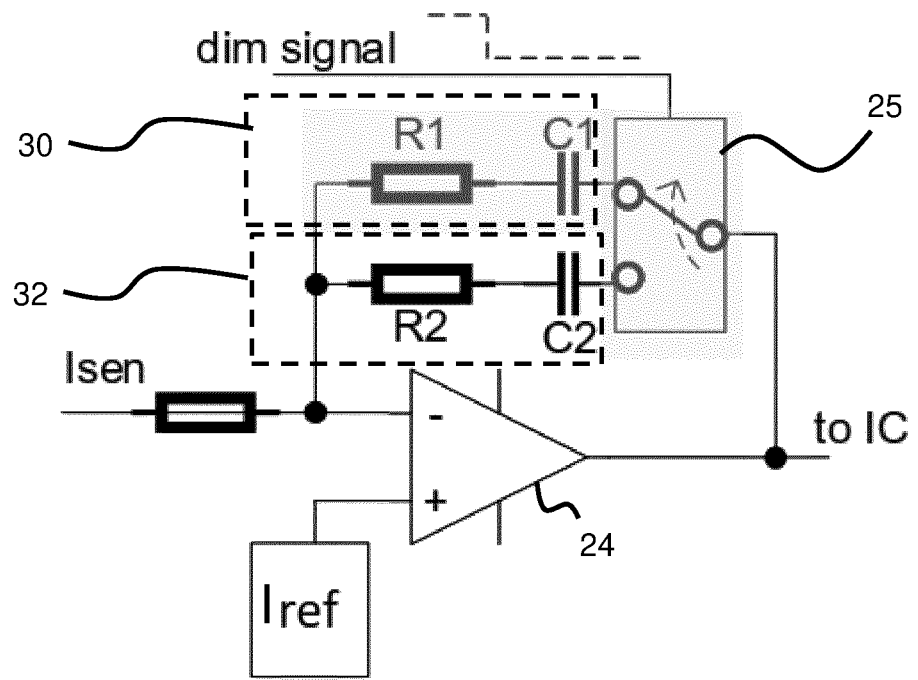
FIG. 3 shows an example of the current control loop using a type I opamp configuration in a state which connects the first compensation circuit.

FIG. 3 shows an example of the current control loop. The error amplifier 24 comprises an opamp, which receives a reference current Iref at the non-inverting input. The compensation circuits 30, 32 each comprises a negative feedback path of the opamp. In the example shown, each negative feedback path comprises a series RC circuit. The first compensation circuit comprises resistor R1 and capacitor C1 and the second compensation circuit comprises resistor R2 and capacitor C2.

The opamp circuit receives the sensed current Isen at the inverting input of the opamp, and it receives the reference current Iref at the non-inverting input of the opamp. The output of the opamp is a voltage substantially equal to the sum of the voltage at the inverting input and the voltage on the capacitor C1, C2 in either the first or the second feedback circuit (when stable no current flows, so there is no voltage drop across the resistors R1, R2). It is noted that the polarity of the voltage on the capacitors C1/C2 may result in a negative value when calculating the sum.

Thus, the stored voltage across the capacitor which is in the feedback path influences and sets the control implemented by the main controller 28.

The switch 25 selects which of the two compensation circuits is connected in the feedback path. When one circuit is disconnected, it becomes open circuit, with the result that the charge stored on the capacitor (and hence voltage) is fixed (i.e. saved or kept). In this way, in this open circuit state, an electrical value of the current control loop (in this case the charge and hence voltage stored on the capacitor) is fixed when the switch 25 instead connects the second compensation circuit 32 (and hence changes the load as seen by the driver from the first level to the second level). Similarly, the saved electrical value (i.e. the fixed charge and voltage on C1) is returned to the current control loop when the switch 25 re-connects the first compensation circuit 30 (and hence changes the load as seen by the driver back from the second level to the first level).

The normal current control loop of the driver thus has a current control loop for analog output current control. In addition, the control of the shorting transistor 22 provides PWM output current control. The use of two compensation circuits (and hence an overall current control loop with adjustable configuration) means that the control loop tunes its internal state by itself instantly instead of having to rely on slow adjustment by the analog current regulation loop. Thus, the response time is quicker to return to the normal state.

FIG. 3 shows the switch 25 in a state which connects the first compensation circuit.

Figure 4:
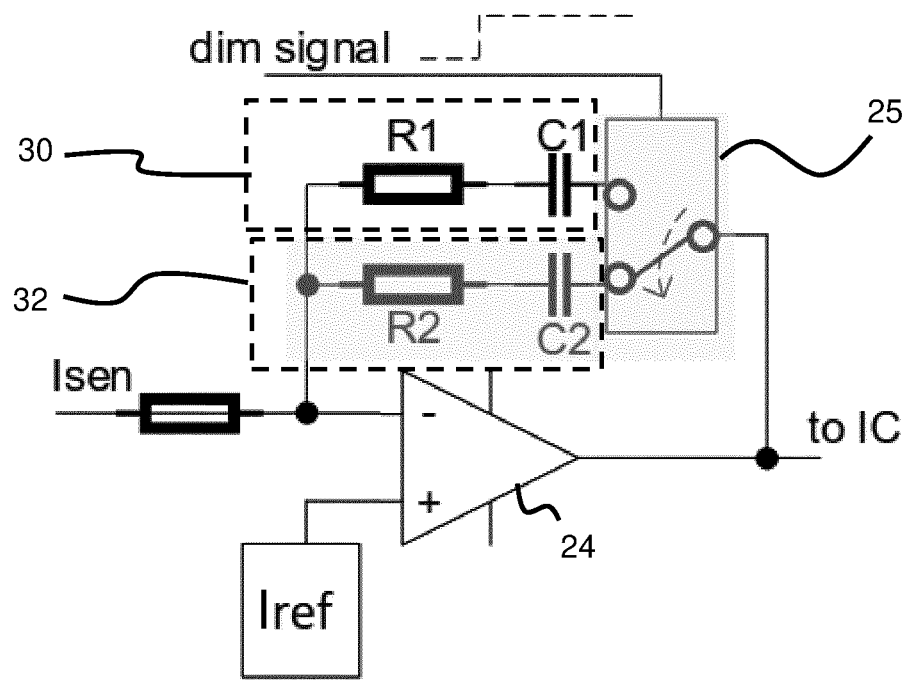
FIG. 4 shows the circuit of FIG. 3 in a state which connects the second compensation circuit.

FIG. 4 shows the circuit with the switch 25 in the state which connects the second compensation circuit.

The switching of the switch 25 is controlled by a "dim signal" which is the same signal used for PWM switching of the shorting transistor 22. This signal for example comes from a motherboard of a LED projector, and is connected to the light source driver to control its dimming behavior.

When the dim signal is low, the shorting transistor 22 is off and the first compensation circuit 30 is selected, and the control loop outputs a high control signal to control the driver switch with a high duty cycle for the load-in current regulation mode. When the dim signal is high, the shorting transistor 22 is on, and the output current is bypassed by the shorting transistor immediately, and the control loops outputs a low control signal to control the driver switch with a low duty cycle for the load-out current regulation mode. The second compensation circuit 32 is selected, to better match the dimming mode (i.e. the short circuit). Because the first compensation circuit is left open circuit, the capacitor charge is maintained with almost no change. When the dim signal is low again, the shorting transistor turns off, the first compensation circuit 30 is selected (while the second compensation circuit 32 is disconnected), and the control loop jumps to output the previous high control signal quickly, so it can control the driver to jump to switch with the high duty cycle for the load-in current regulation mode quickly, and therefore a reduced settling time is achieved.

Figure 5:
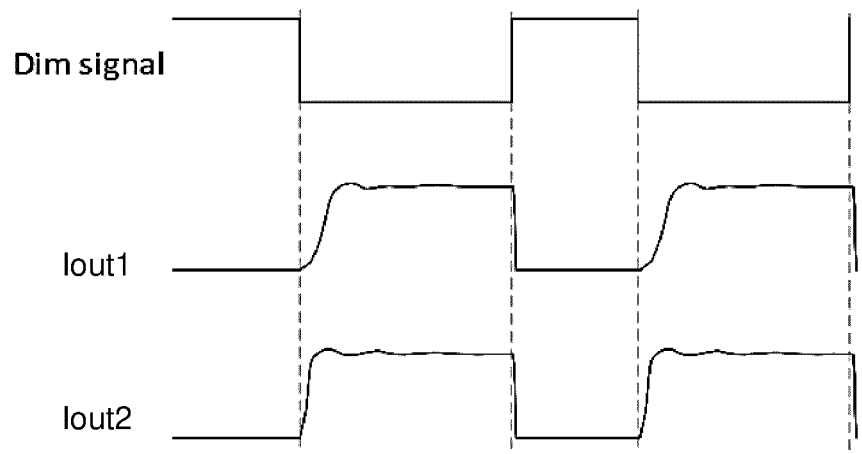
FIG. 5 shows a dim signal and output currents for single compensation circuit of FIG. 1 and for the two compensation circuits of FIG. 2.

FIG. 5 shows the dim signal as the top plot, and shows the output current Iout1 with a single compensation circuit as in FIG. 1 and the output current Iout2 with two compensation circuits as in FIG. 2. The reduced rise time of the output current to the desired current can be clearly seen.

The example above is based on a voltage level stored on the capacitor of a negative feedback path of the error amplifier. However, the invention more generally requires any electrical value to be stored, and this electrical value is the one that influences the converter function in regulating the output current. The example of an capacitor is only one possible example. For example, if it is a digitalized driver, the electrical value can be stored in a digital memory and read out into the current control loop so as to make the current control loop jump to the previous state that controls the converter to output the desired current in loaded condition.

The driver is for example a lighting driver as explained above. The dimming signal input to the controller is used to implement a PWM dimming mode.

The invention also provides a lighting system such as a LED projector comprising the driver and the lighting load 12 driven by the driver. A LED projector for example has a LED projection light source and a LCD display module.

Figure 6:
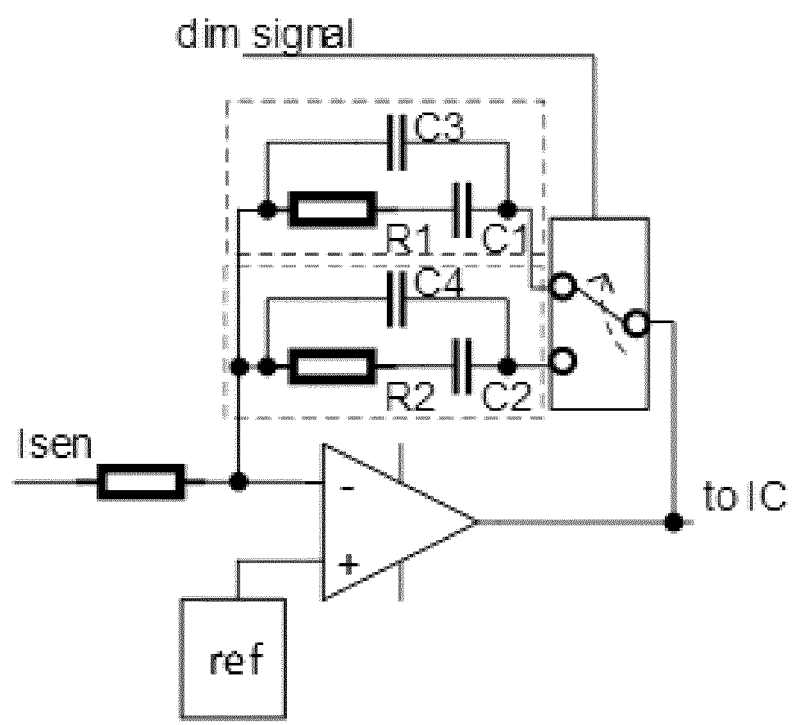
FIG. 6 shows an example of circuit configuration in accordance with the invention using a type II opamp configuration.
Figure 7:
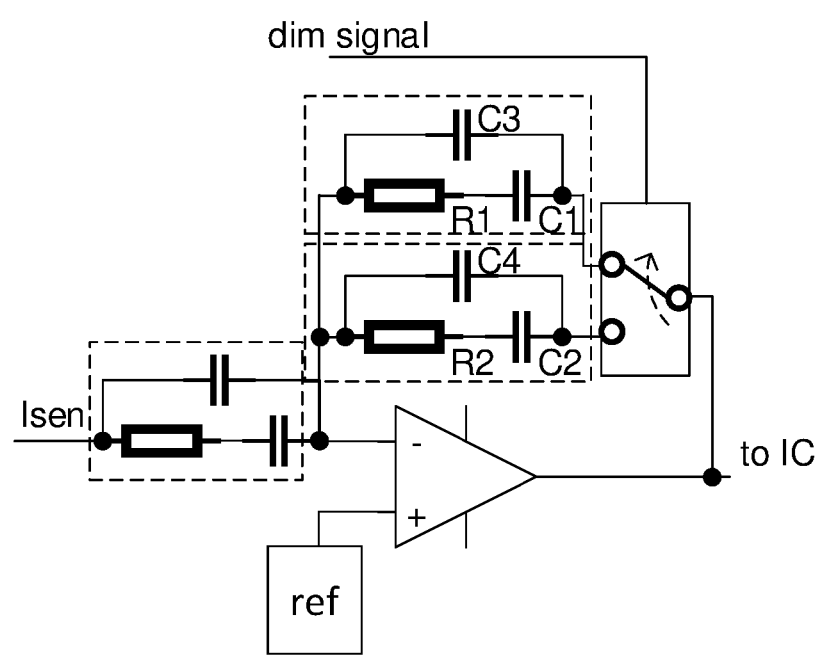
FIG. 7 shows an example of circuit configuration in accordance with the invention using a type III opamp configuration.

The above description describes the embodiments of the invention by using a type I topology of op-amp. It should be understood that the idea of the invention can also be applied to type II and type III topology of op-amp, which are illustrated in FIG. 6 and FIG. 7 respectively.

In the type II configuration, the negative feedback path comprises a series RC circuit in parallel with a second capacitor. Thus one feedback path is R1,C1 in parallel with C3 and the other feedback path is R2, C2 in parallel with C4.

In the type III configuration, there is additionally a reactive (RC) circuit at the inverting input to the opamp.

The operations of the embodiments of the invention in type II and type III op-amp are similar to that in the type I op-amp as described above. The specification thus does not give more details.

Variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality.

The mere fact that certain measures are recited in mutually different dependent claims does not indicate that a combination of these measures cannot be used to advantage.

If the term "adapted to" is used in the claims or description, it is noted the term "adapted to" is intended to be equivalent to the term "configured to".

Any reference signs in the claims should not be construed as limiting the scope.

The invention claimed is:

1. A driver, comprising:
   an input to receive input power,
   a converter to convert the input power to an output current;
   a current control loop for controlling the converter and regulating the output current, the current control loop having an error amplifier and a first compensation circuit provided to an output of the error amplifier, said first compensation circuit comprises a first capacitor;
   an output to output said output current to a load;
   an adjusting circuit to selectively deliver, or not deliver, the output current to the load and effectively adjust the load as seen by the driver between a first level and a second level, and
   a controller for controlling the adjusting circuit and the current control loop, wherein the controller is adapted to:
      save the voltage of the first capacitor of the current control loop by disconnecting the first capacitor from the output of the error amplifier, before the adjusting circuit changes the load as seen by the driver from the first level to the second level; and
      re-connect the first capacitor with the saved voltage to the output of the error amplifier of the current control loop, when the adjusting circuit changes the load as seen by the driver back from the second level to the first level.

2. The driver of claim 1, wherein the current control loop is for regulating a stable peak amplitude of the output current at a desired value, the error amplifier is adapted to compare the output current with a reference current; and the adjusting circuit is for adjusting an effective current amplitude to the load by applying a duty cycle in which the output current with a stable peak amplitude is delivered to the load.

3. The driver of claim 2, wherein the controller is adapted to apply a PWM control signal to the adjusting circuit.

4. The driver of claim 1, wherein the adjusting circuit comprises a circuit to selectively:
open to allow the output current to go through the load, so as to set a load as seen by the driver at the first level; and
short circuit to conduct the output current and bypass the load, so as to set the load as seen by the driver at the second level, for example a zero load level.

5. The driver of claim 4, wherein the adjusting circuit comprises a FET for connection in parallel with the load.

6. The driver of claim 1, wherein the control loop is adapted to retrieve a voltage level or charge level of the first capacitor to control the converter to regulate the output current, the controller is adapted to:
configure the current control loop to include the first capacitor when the LED load is not short circuited and the charge or voltage level of the first capacitor is retrieved by the control loop to control the converter;
decouple the first capacitor from the current control loop before the load is short circuited thereby saving the value of the charge level or voltage level of the first capacitor;
short circuit the load; and
re-configure the current control loop to couple the first capacitor to the current control loop and substantially simultaneously re-connect the load again such that the current control loop is able to retrieve the saved charge or voltage level of the first capacitor instantly when the load is re-connected again.

7. The driver of claim 6, wherein the control loop is adapted to output a control output depending on the voltage of the first compensation circuit to adjust the converted power of the converter, wherein the control loop is adapted to:
form and retrieve a voltage of the first capacitor so as to output a high output to control the converter to output high power when the load is the first level, and form and retrieve a changed voltage so as to output a low output to control the converter to output low power when the load is the second level.

8. The driver of claim 6, wherein the controller is adapted to configure the current control loop to replace the first capacitor with a second capacitor when the load is short circuited, and to decouple the second capacitor from the current control loop and replace with the first capacitor when the load is re-connected again.

9. The driver of claim 8, wherein the current control loop comprises a current sensing component adapted to sense the output current of the driver, and the first compensation circuit is between the output and an inverting input of the error amplifier,
wherein the second capacitor in a second compensation circuit of the error amplifier, and wherein the controller is adapted to control a switch which selects one of the first and second compensation circuits.

10. The driver of claim 9, wherein the first and second compensation circuits each further comprise a resistor for forming a series resistor-capacitor circuit, wherein the first and second compensation circuits are connected alternately, and wherein optionally the error amplifier is in either of a type I, type II, or type III topology.

11. The driver of claim 9, wherein the error amplifier is adapted to receive the sensed output current at the inverting input of the error amplifier, and to receive the reference current at a non-inverting input of the error amplifier, and is adapted to output a voltage substantially equal to the sum of the voltage the inverting input and the voltage on the capacitor in either the first or the second compensation circuit.

12. The driver of claim 1, comprising a lighting driver, wherein the controller has a dimming signal input for setting a dimming output current of the driver, wherein the adjusting circuit and a configuration of the current control loop are selected in dependence on the dimming signal input.

13. A lighting system comprising:
the driver of claim 1; and
a lighting load driven by the driver.

14. The lighting system of claim 13, wherein the lighting load comprises a LED arrangement.

15. A LED projector comprising the lighting system of claim 14.

* * * * *